United States Patent
Woolf et al.

[11] Patent Number: 6,017,489
[45] Date of Patent: Jan. 25, 2000

[54] METHOD OF DENSIFYING POWDER METAL PREFORMS

[75] Inventors: Richard Mark Woolf, Cincinnati; Rajesh Parameswaran, Bellbrook, both of Ohio

[73] Assignee: Federal-Mogul World Wide, Inc., Southfield, Mich.

[21] Appl. No.: 09/251,535

[22] Filed: Feb. 17, 1999

[51] Int. Cl.⁷ ..................................................... B22F 3/24
[52] U.S. Cl. ................................. 419/28; 419/26; 419/5; 72/479
[58] Field of Search ..................................... 29/90.1, 90.5; 72/370.08, 479, 75; 419/5, 26, 28

[56] References Cited

U.S. PATENT DOCUMENTS

| | | |
|---|---|---|
| 175,807 | 4/1876 | Wistar . |
| 3,615,382 | 10/1971 | Manilla et al. . |
| 3,951,561 | 4/1976 | Speakman . |
| 4,059,879 | 11/1977 | Chmura et al. . |
| 4,231,247 | 11/1980 | Haydon ...................................... 72/479 |
| 4,398,407 | 8/1983 | DeFay, Jr. . |
| 4,573,841 | 3/1986 | Petkov et al. . |
| 4,651,926 | 3/1987 | Sasao et al. . |
| 4,727,744 | 3/1988 | Ferree ........................................ 72/466 |
| 4,771,627 | 9/1988 | Speakman . |
| 4,940,565 | 7/1990 | Muller . |
| 5,069,869 | 12/1991 | Nicholas et al. . |
| 5,233,738 | 8/1993 | Finkbeiner et al. . |
| 5,503,506 | 4/1996 | Yuan . |
| 5,685,190 | 11/1997 | Yamamoto et al. ....................... 72/466 |

*Primary Examiner*—Ngoclan Mai
*Attorney, Agent, or Firm*—Reising, Ethington, Barnes, Kisselle, Learman & McCulloch, P.C.

[57] ABSTRACT

A method of densifying the wall of an opening in a powder metal preform includes forcibly extending a densification tool through the opening having a plurality of radially enlarged forming portions arranged in axially spaced succession from smallest to largest which act to enlarge and densify the preform material and impart beneficial compressive stresses. The space between successive forming portions enables the preform material to recover elastically between adjacent forming sections to maximize induced compressive stresses.

8 Claims, 2 Drawing Sheets

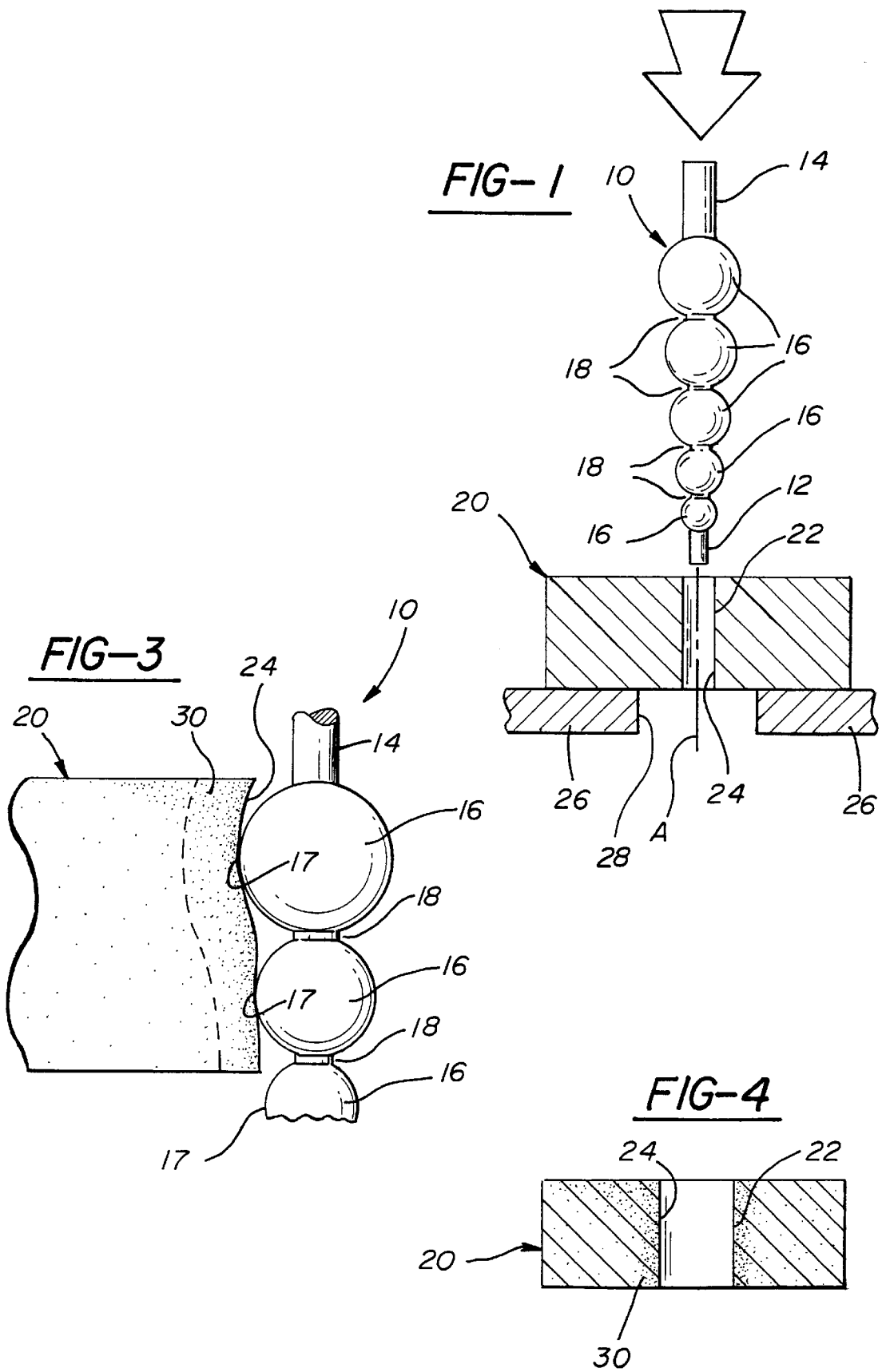

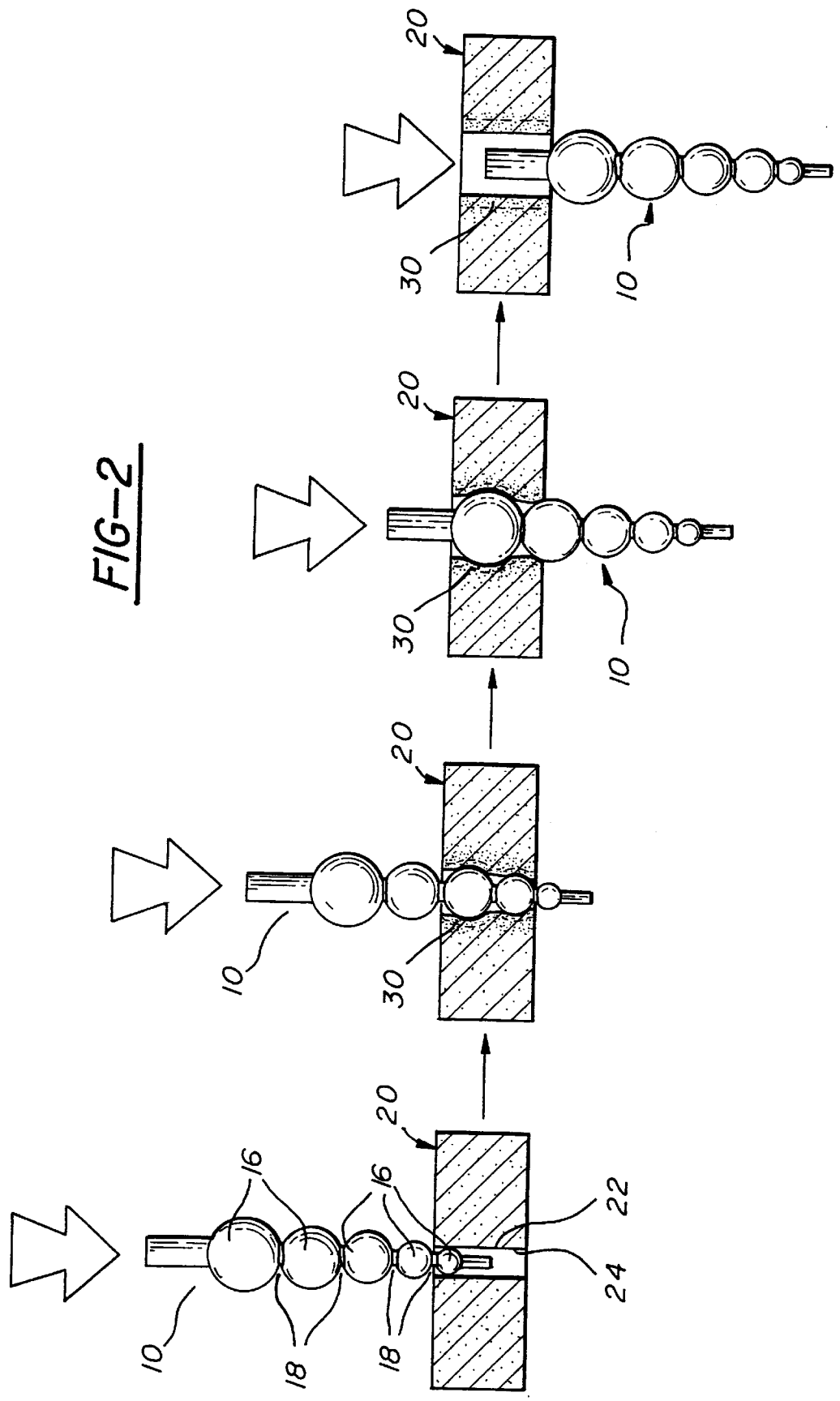

METHOD OF DENSIFYING POWDER METAL PREFORMS

BACKGROUND OF THE INVENTION

1. Technical Field

This invention relates generally to post-sintering densification of powder metal preforms and more particularly to the densification of inner peripheral surfaces of openings provided in powder metal preforms.

2. Related Prior Art

Powder metal components have long offered a low cost alternative for many equivalent wrought components. Powder metal forming eliminates the high cost of machining associated with wrought components. However, in applications where high strength components are required, such as transmission components and hard bearing surfaces for example, traditional powder metal components generally have not exhibited sufficient strength and dimensional tolerances to serve as low cost alternatives to the high strength wrought components in some cases.

A technique commonly used to densify inner peripheral surfaces of openings in powder metal components is roll forming. U.S. Pat. No. 4,059,879 discloses such a roll forming method. According to the disclosed method, a powder metal bearing ring is engaged on its inner surface by a forming roll which, when rotated with an applied force to the preform ring, acts to compress and densify the inner surface to provide a hardened inner race. Additional strength can be imparted to powder metal components by inducing a buildup of compressive stresses in addition to densification. However, the roll forming technique described above does not provide the necessary impact force to achieve a high level of compression stress buildup in the powder metal preform as would be desirable. In addition, special provision must be made to support the preform for rotation without encumbering the inner surface, and the forming tool must be sufficiently small to fit within the opening while being capable of exerting sufficient compaction force to densify the material, both of which add complexity and cost to the manufacture of powder metal components.

It would thus be desirable in the manufacture of powder metal components to provide a process whereby the inner peripheral walls of openings can be densified more efficiently to yield powder metal components comparable in strength and dimensional tolerance to that of wrought components.

SUMMARY OF THE INVENTION

A method of densifying powder metal preforms according to the invention comprises preparing a compacted and sintered powder metal preform having an opening therein with an inner peripheral wall of predetermined initial size to be densified, providing an elongated multi-stage densifying tool having a plurality of radially enlarged forming portions of varying outer dimension arranged in axially spaced succession along the tool from smallest to largest, and forcibly extending the tool axially through the preform opening while successively engaging the wall of the opening with the forming portions from smallest and largest and plastically and elastically deforming the wall in stepped progression thereby enlarging and densifying the wall of the opening and imparting compressive stresses thereto, with the spacing between the forming portions being sufficient to allow elastic recovery of the preform material between successive forming portions.

As the multi-stage tool is forcibly extended through the preform opening, the wall of the opening is successively enlarged in step-wise fashion, imparting densification and introducing beneficial compressive stresses to the preform to provide a high strength wall that is suitable, for example, as an inner wear surface for bearing and bushing applications. The spacing between successive forming portions enables the preform to partially recover elastically in preparation for further deformation by the next forming section stage. Partial recovery of the elastic deformation between adjacent forming portions induces compressive stresses which contribute to the strengthening of the preform.

The method provides a simple, cost effective means of densifying inner peripheral walls of openings in powder metal preforms that can be carried out at high production rate using minimal machines and tooling.

BRIEF DESCRIPTION OF THE DRAWINGS

These and other features and advantages of the present invention will become more readily appreciated when considered in connection with the following detail description and appended drawings, herein:

FIG. 1 is a partly sectional schematic view of a multi-stage forming tool and preform according to the invention;

FIG. 2 is a view like FIG. 1 but showing successive stages of the densifying process of the invention;

FIG. 3 is a fragmentary enlarged sectional view showing the interaction of the forming tool with the preform during densification; and FIG. 4 is a schematic sectional view showing a completed powder metal component.

DETAILED DESCRIPTION

A multi-stage forming tool for densifying powder metal preforms is indicated generally at 10 in FIG. 1 and comprises an elongated member extending axially between opposite leading and trailing ends 12, 14, respectively along an axis A. The tool 10 includes a plurality of radially enlarged forming portions 16 of varying outer dimension or size arranged in axial succession along the length of the tool 10, with the smallest of the forming portions 16 adjacent the leading end 12, and the largest of the forming portions 16 adjacent the trailing end 14, and the forming portions 16 in between being progressively larger in size at predetermined stepped intervals.

It is preferred that the forming portions 16 be integrated as a unitary structure and that the tool 10 be fabricated of a suitable tool steel or the like having the strength and integrity required to densify a selected powder metal component.

It will be seen from FIGS. 1–3 that the forming portions 16 are preferably in the form of bulbous projections or protruberances having smooth outer surfaces free of any cutting edges or features that would act to remove rather than displace material. The outer peripheral surface of the forming portions 16 at the radially largest extent indicated at 17 have the same general complementary shape transverse to the axis A as that of an opening to be densified in a powder metal preform, but being relatively larger in size than that of the opening. The outer peripheral surface of the forming portions 16 contact the preform material at each stage and induce elastic and plastic deformation in the preform. The forming tool may be displaced in a quasi-static fashion, or with very high speed, ensuring an impact on the preform leading to rapid plastic deformation. The result of the deformation of the forming tool densities the preform at and in the vicinity of the inner peripheral walls contacted by the forming tool. This densification leads to a graduation of density and hence material properties. The density is greater at the peripheral walls and gradually decreases. Such a variation of material properties causes incomplete elastic recovery of the material, resulting in compressive residual stresses. At each successive stage, more deformation and less elastic recovery occurs resulting in an increase of compressive residual stresses. The particular transverse cross-sectional shape of the forming portions 16 will, of course, be governed by the particular shape of the opening and could be generally spherical as illustrated in the drawings for denisfying a cylindrical opening in a preform or could be formed in the general shape of spur gears, for example, for densifying an internal spline, or have a square or rectangular shape for densifying a similarly shaped opening in a preform.

The bulbous shape of the forming portion 16 presents a forming surface which is tapered in the axial direction of the tool both on the leading and trailing side of the radially largest region 17 of each forming portion 16. The radially reduced regions between adjacent forming portions 16 define a plurality of annular recovery gaps 18 which separate the regions 17 of the forming portions 16 in axially spaced relation to one another.

FIG. 1 illustrates an exemplary powder metal preform 20 having an opening 22 therein defined by an inner peripheral wall 24 to be densified by the tool 10. The opening 22 in the illustrated example is generally cylindrical in shape, corresponding to the generally spherical shaped forming portions 16 illustrated in the drawings. The preform 20 may be fabricated of any of a number of powder metal compositions such as, for example, steel alloys suitable for a bushing or bearing race applications. The preform 20 is compacted and sintered according to conventional practice into the general shape of a ring with the material having less than 100% theoretical density, for example, in the range of 70–85% of full density. At least some of the forming portions 16 are relatively greater in outer dimensional size than that of the predetermined initial size or dimension of the post-sintered preform opening 22 such that the material of the preform would have to be displaced by the tool 10 in order to enable the extension of the tool 10 through the opening 22.

According to a method of the invention, the preform 20 is supported such as by a stationery base 26 with the opening 22 in the preform 20 aligned with a corresponding larger opening 28 provided in the base 26, or in a way that would enable the tool 10 to be extended through the opening 22 without interference by the base 26.

The preform 20 is positioned beneath the tool 10 which is supported for movement along the axis A concentric with the opening 22. The tool 10 is then forcibly extended, leading end 12 first, rapidly through the opening 22, where upon the successively larger forming portions 16 confront and displace the inner peripheral wall 24 radially outwardly, enlarging the opening 22 and densifying the peripheral wall 24 of the opening 22 as illustrated in FIG. 4, where the resultant hardened densified zone is indicated at 30. As the tool 10 advances through the opening 22, the forming portions 16 impact the preform material at each stage and deform the preform material plastically and elastically and imparts a shock force to the preform 22 which induces a build up of compressive stresses in the preform 20 to assist in strengthening the preform. As the largest region 17 of each forming portion 16 passes by a region of the opening 22, the material of the preform in that region is permitted to spring back and return radially inwardly into the gap 18 as a result of the recovery of some or all of the elastic deformation imparted by the preceding forming portion 16. This recovery of the elastic deformation conditions the preform 20 to gain the maximum additional compressive stresses at each stage of deformation imparted by the forming portions 16. FIG. 3 illustrates, on an exaggerated scale, the elastic recovery that occurs between adjacent forming portions 16 and the subsequent further densification that occurs upon the passage of the next successive and larger forming portion 16.

In summary, the multiple stage step-wise deformation of the inner wall 22 by the tool has the benefit of uniformally densifying the preform in a single manner, while imparting a build up of beneficial compressive stresses that further strengthen the wall 22 and finishing the surface of the wall 22 to within close tolerance.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of densifying powder metal preforms, comprising:

preparing a compacted and sintered powder metal preform having an opening therein with an inner peripheral wall of predetermined initial size and shape to be densified;

providing an elongated multi-stage densifying tool having a plurality of radially enlarged forming portions of varying outer dimension arranged in axially spaced succession along the tool from smallest to largest; and forcibly extending the tool axially through the preform opening while successively engaging the wall of the opening with the forming portions from smallest to largest and plastically and elastically deforming the wall in stepped progression thereby enlarging and densifying the wall of the opening and imparting compressive stresses thereto, with the spacing between the forming portions being sufficient to allow elastic recovery of the preform material between successive forming portions.

2. The method of claim 1 wherein opening in the preform is formed to be initially undersized in relation to the outer dimension of the forming portions.

3. The method of claim 1 wherein the forming portions are provided with bulbous forming surfaces.

4. The method of claim 3 wherein the forming portions are provided in the general form of spheres of increasing larger diameters.

5. The method of claim 1 including supporting the preform stationary and moving the tool axially relative to the preform through the opening.

6. The method of claim 1 wherein the tool is provided free of cutting surfaces that would act to remove material from the preform upon advancement of the tool through the preform.

7. A method of densifying the inner peripheral wall of an opening of predetermined initial size and shape in a powder metal preform comprising:

supporting the preform with the opening lying along an axis;

providing an elongated multi-stage densifying tool having a plurality of radially enlarged forming portions of that same general shape complementing that of the opening but varying in outer dimensional size and arranged in axially spaced succession from smallest to largest with at least some of the forming portions being relatively larger in size than that of the opening; and forcibly extending the tool through the opening and successively engaging the inner peripheral wall of the opening with the forming portions from smallest to largest and plastically and elastically deforming the wall in stepped progression thereby enlarging and densifying wall of the opening and imparting compressive stresses thereto, with the spacing between the forming portions allowing for elastic springback of the preform material between successive forming portions.

8. The method of claim 7 wherein the forming portions are provided in the form of spherical segments of successively larger diameters.

* * * * *

UNITED STATES PATENT AND TRADEMARK OFFICE
CERTIFICATE OF CORRECTION

PATENT NO. : 6,017,489
DATED : January 25, 2000
INVENTOR(S) : Richard M. Woolf et al It is certified that error appears in the above-identified patent and that said Letters Patent is hereby corrected as shown below:

Column 2, line 23, should read -- wherein -- instead of "herein".

Column 3, line 1, should read -- densifies -- instead of "densities".

Signed and Sealed this

Nineteenth Day of December, 2000

Attest:

Q. TODD DICKINSON

Attesting Officer

Commissioner of Patents and Trademarks